United States Patent [19]

Canard et al.

[11] 4,010,307

[45] Mar. 1, 1977

[54] COATING OF PAPER, CARDBOARD AND THE LIKE AND COMPOSITION

[75] Inventors: Pierre Canard, Versailles; Albert Levy, Orly, both of France

[73] Assignee: Rhone-Progil, Courbevoie, France

[22] Filed: Nov. 13, 1974

[21] Appl. No.: 523,368

[30] Foreign Application Priority Data

Nov. 15, 1973 France .......................... 73.40635
Mar. 1, 1974 France .......................... 74.07018
Oct. 2, 1974 France .......................... 74.33180

[52] U.S. Cl. .................... 428/327; 260/8; 260/17.4 ST; 260/29.6 RB; 260/29.6 WA; 260/29.7 UA; 427/391; 428/330; 428/476; 428/477; 428/478; 428/511; 428/514; 428/512; 428/513; 428/533; 428/539; 428/537
[51] Int. Cl.² .................... B32B 5/16; D21H 1/28
[58] Field of Search .......... 428/327, 514, 512, 330, 428/476, 477, 487, 513, 511, 533, 537, 539; 260/8, 17.45 ST, 29.6 RB, 29.6 WA, 29.7 UA; 427/391

[56] References Cited

UNITED STATES PATENTS

| | | | |
|---|---|---|---|
| 3,281,267 | 10/1966 | Rice | 428/330 |
| 3,494,878 | 2/1970 | Harren | 428/327 |
| 3,506,474 | 4/1970 | Neuhaus | 428/327 |
| 3,527,729 | 9/1970 | Bingham | 428/327 |
| 3,573,236 | 3/1971 | Barlow | 428/514 |
| 3,645,952 | 2/1972 | Lindemann | 428/514 |
| 3,706,589 | 12/1972 | Fukuda | 428/327 |
| 3,772,073 | 11/1973 | Holty | 428/514 |
| 3,779,800 | 12/1973 | Heiser | 428/514 |

*Primary Examiner*—Ellis P. Robinson
*Attorney, Agent, or Firm*—McDougall, Hersh & Scott

[57] ABSTRACT

A paper or cardboard coating composition comprising an aqueous dispersion containing binder and pigment in which 5–30 percent by weight of the pigment are particles dimensioned within the range of 0.05–0.3 microns of a non-film forming synthetic polymer and in which 70–95 percent by weight of the pigment is calcium carbonate.

5 Claims, No Drawings

COATING OF PAPER, CARDBOARD AND THE LIKE AND COMPOSITION

The present invention relates to aqueous compositions for coating of paper and cardboard to provide an adherent coating. It also concerns a process for coating paper and cardboard by means of said compositions and papers and cardboard coated by said process.

It is known that aqueous compositions for coating paper and cardboard normally contain pigments and binders. The pigment which is most commonly used is a mineral clay. It is also possible to use, in a small proportion of the clay, other pigments such as calcium carbonate, titanium oxide, hydrargillite, talc and barium sulphate. These pigments are formed into a dispersion in water, generally at an alkaline pH and in the presence of dispersing agents of which the most commonly used are tetrasodium pyrophosphate, sodium hexametaphosphate and polyacrylates of low molecular weight in an amount from 0.2 to 0.5% by weight with respect to the pigments. These pigments are fixed to the paper or cardboard by the binder. There are generally used as binders an aqueous dispersion of a synthetic polymer such as a copolymer of styrene and butadiene, an acrylic polymer or a vinyl acetate polymer alone, or in admixture with natural binders such as starches, proteins, casein or synthetics such as polyvinyl alcohol. It is also possible to add to the aqueous dispersions, products capable of improving the water retention properties of the coating compositions, such as carboxymethylcellulose or alginates.

The coating compositions finally may contain other ingredients especially reticulation agents, anti-foaming agents, antifriction agents, optical blueing agents and coloring agents.

The coating of paper and cardboard by means of aqueous compositions may be carried out by means of coating machines using various techniques and making use of various devices among which may be mentioned those used industrially and known under the following names: air blade, size press, Champion coater, Massey coater, and a trailing scraper. After coating, the paper or cardboard is subjected to a drying operation.

Desirable properties of coated papers and cardboard are on the one hand properties such as whiteness, brilliance and opacity and on the other hand properties of printability.

The pigment coated onto the paper should give optical properties among which may be mentioned the brilliance of the coated paper. The brilliance of a coated paper only appears when, after drying, it is submitted to a finishing operation, for example calendering, which consists of passing the coated paper under pressure between two or more rollers rotating at different speeds. The friction which is produced allows, on the one hand, smoothing of the paper surface and, on the other hand, it gives to laminar particles of pigment the same orientation parallel to the plane of the paper which is responsible for the brilliance.

Increase of the calendering pressure allows in all cases an improvement of the brilliance; however in certain cases the calendering pressure is limited because it is necessary to maintain an adequate porosity of the layer as required for good printability of the coated paper (the porosity decreases as the calendering pressure increases) or, in the case of coated cardboard, to maintain the rigidity. The level of brilliance desired to be obtained in these cases thus requires the use of paper finishing techniques which are more elaborate than simple calendering, such as brushing and supercalendering.

The pigment which is most commonly used in coating compositions is kaolin; to improve the brilliance of the coated paper, it is possible to mix with the kaolin small proportions of other pigments such as alumina, satin white, and calcium carbonate of very fine grain size. The use of these additives allows improvement of the brilliance without degradation and often with improvement of other optical properties and printability of the coated paper.

The applicant has now found that it is possible to obtain coated papers having excellent brilliance using aqueous paper coating compositions containing synthetic polymers in the form of a latex, as a secondary pigment.

According to one aspect of the invention, there is provided a composition for coating paper, cardboard and the like, comprising an aqueous dispersion of a binder and a pigment, from 5 to 30% by weight of the pigment comprising particles of a nonfilmogenic synthetic polymer which is insoluble in the binder, the particles having diameters from 0.05 to 0.30 microns.

The term "nonfilmogenic", used herein signifies that the synthetic polymer does not form a film under the conditions normally used for coating and finishing the paper or cardboard.

It has been indicated above that the use of calcium carbonate of very fine granulometry in mixture with kaolin allows improvement of the brilliance of the coated paper. "Very fine granulometry" means having a particle size of about 0.2 microns.

It is also known that the use of calcium carbonates of granulometry which is greater, that is to say, formed of particles of diameter generally from 0.6 to 2 microns, diminishes the brilliance of coated papers, which does not allow their use as a principal pigment.

The applicant has now found that it is possible to obtain coated papers having an excellent brilliance using aqueous compositions according to the above-mentioned aspect of the invention containing, as principal pigment, 70 to 95% by weight of calcium carbonate formed of particles of diameter from 0.6 to 2 microns.

A particularly preferred class of synthetic polymers usable as the pigment is that of polymers which are predominating hydrocarbon.

As examples of appropriate organic products which may be used as particles of plastic material according to a process of the present invention, there are polyvinyl aromatic compounds such as polystyrene, poly-α-methylstyrene, poly-4-methylstyrene, poly-2-methylstyrene, poly-3-methylstyrene, poly-4-methoxystyrene, poly-2-hydroxylmethylstyrene, poly-4-ethylstyrene, poly-4-ethoxystyrene, poly-3,4-dimethylstyrene, poly-2-chlorostyrene, poly-3-chlorostyrene, poly-4-chloro-3-methylstyrene, poly-4-tertiary-butylstyrene, poly-2,4-dichlorostyrene, poly-2,6-dichlorostyrene, poly-2,5-difluorostyrene, poly-1-vinylnaphthalene; polyolefins and polyhalo-olefins such as polyvinyl chloride, poly-3-cyclohexyl-1-propene, polyvinylcyclohexane, polyhexafluoropropylene, poly-3-orthomethylphenylpropene, polyethylene, polypropylene, poly-1-butene, poly-1-pentene, poly-3,3-dimethyl-1-butene, poly-5,5-dimethyl-1-hexene and poly-3-methyl-1-butene, polyvinylidene chloride, poly-1,2-difluoroethylene, the esters of acids having α,β-ethylenic unsaturation such as polymethacrylates, polychloroacrylates, polychloromethacrylates, for example polymethyl methacrylate, poly-2-chloroethyl methacrylate, polyisopropylmethacrylate, polycyclohexyl chloroacrylate, polyethyl chloroacrylate, polyisobutyl chloroacrylate, polyisopropyl chloroacrylate and polymethyl chloroacrylate; other polyesters such as polyethylene 1,5-naphthalate, polyethylene terephthalate, polyvinyl acetate, polyallyl acetate and polyvinyl propionate and polysulphones. There may also be used copolymers of which the monomeric constituents are those of polymers mentioned above.

In the polymers which may be used, as mentioned above, small quantities, that is to say for example up to 20% of various other neutral copolymerizable monomers, such as the monomers of diethylenic conjugated unsaturation and alkyl acrylates may be present as comonomers. The monomers having conjugate diethylenic unsaturation include: 1,3-butadiene, isoprene and 2-chloro-1,3-butadiene. Examples of such alkylacrylates are methyl acrylate, ethyl acrylate, n-propyl acrylate, sec-butyl acrylate and n-butyl acrylate.

Small quantities of carboxylic acids having α,β-ethylenic unsaturation may also be used as comonomers in the plastics material pigment. Such carboxylic acids include acrylic acid, methacrylic acid, maleic acid, itaconic acid and fumaric acid.

The synthetic polymers which may be used as pigments in the process of the invention may be prepared in the form of a latex by any known process used in polymerization in aqueous emulsion. There may be prepared, for example, a dispersion of the monomer or monomers in an aqueous solution containing an emulsifier and an electrolyte. There is added to the dispersion a water soluble catalyst of the free radical type to start the polymerization and the mixture is agitated to complete the polymerization. The dimensions of the particles may be controlled by known means, as for example, by variation of the quantities of the emulsifier and electrolyte in the system.

The binders which may be used in the present invention include natural binders such as starch, proteins and casein and known synthetic binders. The synthetic binders include copolymers of styrene and butadiene, the copolymers of alkyl acrylates and styrene, copolymers of alkyl acrylate and vinyl acetate, and homopolymers of vinyl acetate.

In a preferred embodiment of the invention, the compositions contain by weight 60 to 250 parts of binder per 100 parts of pigment polymer, and 6 to 25 parts of binder per 100 parts of the total of pigment.

The aqueous compositions, which are the object of the invention, may be prepared by mixing the secondary pigment, in the form of latex, with an aqueous medium containing binder, the other pigment or pigments and any other ingredients.

The aqueous compositions, according to the invention, are applied to at least one surface of the paper or cardboard by any known means, such as by air knife, size press, Champion coater, Massey coater and trailing scraper. After coating the paper or cardboard, there is carried out an operation of drying followed by a finishing operation, such as calendering, brushing or supercalendering.

The invention will be illustrated by the following examples:

EXAMPLES 1 – 14

There are prepared aqueous coating compositions which are applied on paper by means of an air blade coater at the thickness which is equal for each of the compositions. The paper thus coated is dried in a tunnel oven at a temperature of 90° C, then subjected to calendering consisting of 4 successive passes between two cylinders under a force of 50 kg/cm.

After drying and calendering, the coated paper is held at a temperature of 20° C in an atmosphere of 65% humidity, then examined from the point of view of whiteness, brilliance, opacity, dry tear strength and wet tear strength, by means of the following methods:

Whiteness — It is determined according to Standard AFNOR Q 03.039 titled "Determination of degree of whiteness "ISO" of papers and cardboard".

Brilliance — It is determined by means of an Electrosynthesis SP 64 reflectometer.

Opacity — This is measured according to Standard AFNOR Q 03.006 entitled "Measurement of Opacity of Papers".

Dry Tear strength — This is determined by means of an IGT apparatus designed by "Institute von Grafische Technik" in which the coated paper or cardboard is put into contact with a serrated inking roller, the pressure of the paper or cardboard is adjusted to a given value and the speed increased until there is observed the start of tearing of the coated layer.

The resistance to dry tearing is determined by the value of the speed corresponding to the start of tearing. There is used ink 3804 of predetermined penetration sold by Etablissements Lorilleux Lefrance.

Wet resistance to tearing — This is also determined by means of the IGT apparatus but inking is effected with a specimen of coated paper or cardboard on which there is first deposited a thin film of water. The resistance to wet tearing is determined visually by comparison with other samples. There is used ink 3801 sold by Etablissements Lorilleux Lefrance. The results are expressed by numbers ranging from 0 to 10, numeral 0 corresponding to paper having a very poor resistance and numeral 10 to a paper having an excellent resistance.

Two sets of trials will be distinguished in the results given below. The first, relating to Examples 1 to 9, shows the effect of the size of particles of synthetic pigment on the results obtained as well as the possibility of using kaolins of large granulometry as the principal pigment. The second, relating to Examples 10 to 14, shows the possibility of using calcium carbonates of currently used granulometry as a principal pigment.

There will be distinguished four categories of kaolin referred to respectively as kaolins 1 to 3 and high brilliance kaolin having the granulometry shown in Table 1 below:

TABLE 1

|  | % by weight of particles of diameter less than 2 microns |
|---|---|
| Kaolin No. 1 | 90 to 94 |
| Kaolin No. 2 | 80 to 84 |
| Kaolin No. 3 | 65 to 75 |
| "High brilliance" kaolin | 95 to 100 |

Kaolins 1, 2 and high brilliance kaolin, used alone as pigments, produce by reason of their sufficiently fine granulometry coated papers having an acceptable brilliance.

Kaolin 3 has not so far been used for coating of paper because, by reason of its large grain size, it gives coated papers having an insufficient brilliance.

Table 2 below shows characteristics of latex having 50% by dry weight of synthetic polymers used as pigments.

TABLE 2

|  | Type of Polymer | Size of particles (microns) |
|---|---|---|
| Latex A | Polystyrene | 0.15 |
| Latex B | Polystyrene | 0.35 |
| Latex C | Polyvinyl chloride | 0.15 |
| Latex D | Polysulphones | 0.20 |
| Latex E | Polystyrene | 0.28 |

EXAMPLES 1 – 9

Table 3 below shows the nature and content by weight of solid constituents of coating compositions for each example and also the weight of coating deposited. The coating compositions are adjusted to a pH of 8.5 by addition of ammonia. They are prepared in such a manner as to contain 60% by weight of dry matter and their binder content is adjusted so that they have the same resistance to dry tearing. The weight of composition deposited is such that the thickness of the layer is the same for all the examples.

TABLE 3

|  | EXAMPLE | | | | | | | | |
|---|---|---|---|---|---|---|---|---|---|
|  | 1 | 2 | 3 | 4 | 5 | 6 | 7 | 8 | 9 |
| Kaolin No. 1 | — | — | — | — | — | — | 100 | — | — |
| Kaolin No. 2 | 100 | 90 | 80 | 80 | 80 | 80 | — | — | — |
| Kaolin No. 3 | — | — | — | — | — | — | — | 100 | 80 |
| Sodium Pyrophosphate | 0.4 | 0.4 | 0.4 | 0.4 | 0.4 | 0.4 | 0.4 | 0.4 | 0.4 |
| Butadiene styrene carboxylated lates | 14 | 16.8 | 19.6 | 19.2 | 19.8 | 18 | 14 | 14 | 16.8 |
| Latex A | — | 10 | 20 | — | — | — | — | — | — |
| Latex B | — | — | — | — | — | 20 | — | — | — |
| Latex C | — | — | — | 20 | — | — | — | — | — |
| Latex D | — | — | — | — | 20 | — | — | — | — |
| Latex E | — | — | — | — | — | — | — | — | 20 |
| Weight of layer (g/m²) | 20 | 19 | 18 | 18.5 | 18 | 18 | 20 | 19 | 18 |

Table 4 below indicates, for each example, the properties of the paper obtained.

TABLE 4

|  | EXAMPLE | | | | | | | | |
|---|---|---|---|---|---|---|---|---|---|
|  | 1 | 2 | 3 | 4 | 5 | 6 | 7 | 8 | 9 |
| Whiteness % | 74.1 | 75.3 | 75 | 75.7 | 75.3 | 75 | 74.1 | 73.2 | 74.2 |
| Brilliance % | 21 | 28 | 30 | 28 | 31 | 23 | 21 | 12 | 22 |
| Opacity % | 89.1 | 89.6 | 89.1 | 89.4 | 89.3 | 89.1 | 90.4 | 90.2 | 89.1 |
| Dry IGT (cm/s) | 68 | 68 | 68 | 68 | 68 | 68 | 68 | 68 | 68 |
| Wet IGT | 4 | 6 | 7 | 5 | 6 | 5 | 4 | 4 | 5 |

The Examples 1, 6, 7 and 8 are given by way of comparison. Examples 2, 3, 4, 5 and 9 are according to the invention.

It is evident that the aqueous compositions of Examples 2, 3, 4, 5 and 9 produce coated papers which are notably more brilliant than those obtained, all other things being equal, with the control compositions and having other properties which are at least equivalent.

It will also be seen that the aqueous composition which contains, as principal pigment, kaolin 3 (Example 9) produces a coated paper having a brilliance as high as that obtained using the single pigment kaolin 1 (Example 7) and of which the other properties are equivalent.

EXAMPLES 10 – 14

Table 5 below indicates the nature and content by weight of solid constituents of the coating compositions for each Example as well as the weight of the coating deposited. The compositions, for coating, are adjusted to a pH of 8.5 by addition of ammonia. They contain 60% by weight of dry matter and their content of binder is adjusted in such a manner as to obtain the same resistance to dry tearing.

The weight of layer deposited is such that the thickness of the layer is the same for all the Examples.

TABLE 5

|  | EXAMPLE | | | | |
|---|---|---|---|---|---|
|  | 10 | 11 | 12 | 13 | 14 |
| Kaolin No. 2 | 100 | — | — | — | — |
| Precipitated calcium carbonate formed of particles of 1 micron diameter | — | 100 | — | 80 | — |
| Natural calcium carbonate formed of particles of 1 micron diameter | — | — | 100 | — | 80 |
| Sodium pyrophosphate | 0.4 | 0.6 | 0.6 | 0.55 | 0.55 |
| Butadiene carboxylated styrene latex | 14 | 14 | 14 | 19.6 | 19.6 |
| Carboxymethylcellulose | 0.5 | 0.5 | 0.5 | 0.5 | 0.5 |
| Latex A | — | — | — | 20 | 20 |
| Weight of layer (g/m²) | 20 | 20 | 20 | 18 | 18 |

Table 6 below indicates, for each Example, the properties of the coated papers obtained.

TABLE 6

|  | EXAMPLE | | | | |
| --- | --- | --- | --- | --- | --- |
|  | 10 | 11 | 12 | 13 | 14 |
| Whiteness | 82 | 81 | 82 | 82 | 83 |
| Brilliance (%) | 20 | 3 | 0 | 22 | 20 |
| Opacity (%) | 90.2 | 90.2 | 90.5 | 91.0 | 89.9 |
| Dry IGT (cm/s) | 52 | 52 | 52 | 52 | 52 |
| Wet IGT | 8 | 10 | 10 | 9 | 8 |

Examples 10, 11 and 12 are given for comparison, the Examples 13 and 14 are according to the invention.

It will be seen that the aqueous compositions of Examples 13 and 14 produce coated papers having a brilliance as high as that obtained using as a single pigment kaolin (Example 10), which is not the case when calcium carbonate is utilized as the only pigment (Examples 11 and 12).

In the case when precipitated calcium carbonate is used as pigment, it is found that there is obtained a coated paper having a high porosity which is favorable for avoiding blotching during printing.

We claim:

1. A composition for coating paper, cardboard and the like, consisting essentially of an aqueous dispersion of a binder and a pigment in which 70 to 95% by weight of the pigment is calcium carbonate particles having a size within the range of 0.6 to 2 microns and 5 to 30% by weight of the pigment comprises particles of a non-filmogenic synthetic polymer which is insoluble in the binder, the particles of non-filmogenic synthetic polymer being dimensioned within the range of 0.05 to 0.30 microns in which the binder is selected from the group consisting of starches, proteins, casein, polyvinyl alcohol, styrene-butadiene copolymers, alkyl acrylate - styrene copolymers, alkyl acrylate - vinyl acetate copolymers and vinyl acetate homopolymers, and in which the non-filmogenic synthetic polymer is selected from the group consisting of aromatic polyvinyl compounds, polyolefins, polyhaloolefins, polyesters and polysulphones.

2. A composition as claimed in claim 1 containing 6 to 25 parts by weight of binder per 100 parts of pigment.

3. A process for coating papers and cardboard, in which there is applied to at least one of the surfaces of the paper or cardboard a layer of the aqueous composition claimed in claim 1.

4. Paper and cardboard coated with the composition claimed in claim 1.

5. Paper and cardboard coated by the process of claim 3.

* * * * *